(12) United States Patent
Prawdiuk et al.

(10) Patent No.: US 7,200,610 B1
(45) Date of Patent: Apr. 3, 2007

(54) SYSTEM AND METHOD FOR CONFIGURING FIBRE-CHANNEL DEVICES

(75) Inventors: Pawlo P. Prawdiuk, St. Paul, MN (US); Eric Thorn, Farmington, MN (US); Stephen P. De Groote, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 528 days.

(21) Appl. No.: 10/128,655

(22) Filed: Apr. 22, 2002

(51) Int. Cl.
*G06F 7/00* (2006.01)
*G06F 15/177* (2006.01)

(52) U.S. Cl. .................... 707/104.1; 709/220; 709/223

(58) Field of Classification Search ................. 370/389, 370/400, 388, 351; 707/10; 709/246, 223, 709/225

See application file for complete search history.

(56) References Cited

U.S. PATENT DOCUMENTS

| | | | |
|---|---|---|---|
| 4,495,617 A * | 1/1985 | Ampulski et al. .......... 370/452 |
| 5,390,326 A | 2/1995 | Shah | |
| 5,461,608 A | 10/1995 | Yoshiyama | |
| 5,473,599 A | 12/1995 | Li et al. | |
| 5,535,395 A | 7/1996 | Tipley et al. | |
| 5,544,077 A | 8/1996 | Hershey | |
| 5,579,491 A | 11/1996 | Jeffries et al. | |
| 5,600,828 A * | 2/1997 | Johnson et al. ................. 707/1 |
| 5,666,486 A | 9/1997 | Alfieri et al. | |
| 5,732,206 A | 3/1998 | Mendel | |
| 5,812,821 A | 9/1998 | Sugi et al. | |
| 5,870,571 A | 2/1999 | Duburcq et al. | |
| 5,909,544 A | 6/1999 | Anderson et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |
| 6,009,476 A | 12/1999 | Flory et al. | |
| 6,018,765 A | 1/2000 | Durana et al. | |
| 6,041,381 A | 3/2000 | Hoese | |
| 6,078,957 A | 6/2000 | Adelman et al. | |
| 6,108,300 A | 8/2000 | Coile et al. | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |

(Continued)

OTHER PUBLICATIONS

Gusella, R. , et al., "An Election Algorithm for a Distributed Clock Synchronization Program", *CS Technical Report #275*, University of California, Berkeley,(Dec. 1985),pp. 1-14.

(Continued)

*Primary Examiner*—Alford Kindred
*Assistant Examiner*—Belix M. Ortiz
(74) *Attorney, Agent, or Firm*—Schwegman, Lundberg, Woessner & Kluth P.A.

(57) ABSTRACT

A system includes a configuration module operable to configure a routing device to communicate with one or more network devices. Each of the network devices having device identifiers and other device data. The device data can be maintained in a database. The system also includes a command interpreter for the configuration module. The command interpreter operates to display at least a subset of the device identification data in response to detecting a completion token entered by the user.

18 Claims, 5 Drawing Sheets

U.S. PATENT DOCUMENTS

| | | | |
|---|---|---|---|
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 * | 7/2001 | Koppolu et al. | 358/1.13 |
| 6,269,396 B1 | 7/2001 | Shah et al. | |
| 6,314,526 B1 | 11/2001 | Arendt et al. | |
| 6,343,320 B1 | 1/2002 | Fairchild et al. | |
| 6,363,416 B1 | 3/2002 | Náeimi et al. | |
| 6,378,025 B1 | 4/2002 | Getty | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 * | 11/2002 | Weber et al. | 709/246 |
| 6,484,245 B1 | 11/2002 | Sanada et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,678,721 B1 | 1/2004 | Bell | |
| 6,683,883 B1 | 1/2004 | Czeiger et al. | |
| 6,691,244 B1 | 2/2004 | Kampe et al. | |
| 6,697,924 B2 | 2/2004 | Swank | |
| 6,701,449 B1 | 3/2004 | Davis et al. | |
| 6,718,361 B1 | 4/2004 | Basani et al. | |
| 6,721,907 B2 | 4/2004 | Earl | |
| 6,724,757 B1 * | 4/2004 | Zadikian et al. | 370/388 |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,771,663 B1 | 8/2004 | Jha | |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 | 1/2005 | Miller et al. | |
| 6,856,591 B1 | 2/2005 | Ma et al. | |
| 6,859,462 B1 * | 2/2005 | Mahoney et al. | 370/428 |
| 6,877,044 B2 | 4/2005 | Lo et al. | |
| 6,886,171 B2 | 4/2005 | MacLeod | |
| 6,895,461 B1 | 5/2005 | Thompson | |
| 6,920,491 B2 * | 7/2005 | Kim | 709/220 |
| 6,938,092 B2 | 8/2005 | Burns | |
| 6,944,785 B2 | 9/2005 | Gadir et al. | |
| 7,043,727 B2 | 5/2006 | Bennett et al. | |
| 2002/0010750 A1 | 1/2002 | Baretzki | |
| 2002/0042693 A1 | 4/2002 | Kampe et al. | |
| 2002/0049845 A1 | 4/2002 | Sreenivasan et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0182455 A1 | 9/2003 | Hetzler et al. | |
| 2003/0208579 A1 | 11/2003 | Brady et al. | |
| 2003/0210686 A1 * | 11/2003 | Terrell et al. | 370/389 |
| 2004/0024778 A1 * | 2/2004 | Cheo | 707/104.1 |
| 2004/0064553 A1 | 4/2004 | Kjellberg | |
| 2004/0141468 A1 | 7/2004 | Christensen | |
| 2004/0233910 A1 | 11/2004 | Chen et al. | |
| 2005/0055418 A1 | 3/2005 | Blanc et al. | |
| 2005/0063313 A1 | 3/2005 | Nanavati et al. | |
| 2005/0268151 A1 | 12/2005 | Hunt et al. | |

OTHER PUBLICATIONS

Gusella, R., et al., "The Berkeley UNIX Time Synchronization Protocol", *UNIX Programmers Manual 4.3*, vol. 2C, Berkeley Software Distrib.,,(1986),10 p.

Knight, S., et al., *Virtual Router Redundancy Protocol*, Network Working Group, RFC 2338, obtained from http://www.search.ietf.org/rfc/rfc2338.txt,(1998),26 p.

Lewis, P., "A High-Availability Cluster for Linux", *Linux Journal*, 64, obtained from http://www2.linuxjournal.com/lj-issues/issue64/3247.html,(Apr. 1994),11 p.

Li, T., et al., *Cisco Hot Standby Router Protocol (HSRP)*, Network Working Group, RFC 2281, obtained from http://www.search.ietf.org/rfc/rfc2281.txt,(1998),16 p.

Meth, K. Z., et al., "Design of the iSCSI protocol", *Proceedings of the 20th IEEE Conference on Mass Storage Systems and Technologies*, (Apr. 7-10, 2003),116-122.

Moore, K., *On the Use of HTTP as a Substrate*, Network Working Group, RFC 3205, obrtained from http://www.search.ietf.org/rfc/rfc3205.txt,(2002),14 p.

Satran, J., et al., *iSCSI*, IPS Internet Draft, draft-ietf-ips-iSCSI-12.txt, Category: standards—track,(Apr. 17, 2002),260 p.

Simitci, H., et al., "Evaluation of SCSP over TCP/IP and SCSI over fibre channel connections", *Hot Interconnects*, 9, (Aug. 2001),87-91.

*VMware ESX Server: User's Manual*, Version 1.0, obtained from http://web.archive.org/web/20010608201203/www.vmware.com/support,(Jun. 6, 2001),122-124.

Bakker, G., *IP Aliasing*, obtained from http://www.zone-h.org/files/24/ip_aliasing.txt,(1999),3 p.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt,(Nov. 2000),78 p.

* cited by examiner

| | wwnn 412 | wwpn 414 | loopid 416 | lun 418 | vendor 400 | product 420 | serial number 404 |
|---|---|---|---|---|---|---|---|
| 1: | 20000020371912d5 | 22000020371912d5 | 8 | 0 | SEAGATE | ST39103FC | LS09996900001951 1C2H |
| 2: | 20000020371912da | 22000020371912da | 9 | 0 | SEAGATE | ST39103FC | LS09777600001951 1C3B |
| 3: | 20000020371912 9d | 22000020371912 9d | 10 | 0 | SEAGATE | ST39103FC | LS1019900000194 11NGQ |
| 4: | 2000002037191505 | 2200002037191505 | 12 | 0 | SEAGATE | ST39103FC | LS0922880000195 12N3V |
| 5: | 20000020371912b2 | 22000020371912b2 | 15 | 0 | SEAGATE | ST39103FC | LS0998430000194 30RC7 |

400

FIG. 4 portlundb.txt

```
// LUN DATA BASE ENTRY
class LunDataBaseEntry {
public:
        LunDataBaseEntry               *next_m;
        LunDataBaseEntry               *prev_m;
        // attributes
        UINT32                         lun;
        // entry considered invalid if wwnn is zero
        char                           wwnn[8];
        scsi_inquiry_data              stdInquiry;
        scsi_vpd_unit_device_id        vpdUnitDevId;
        scsi_vpd_unit_serial_number    vpdSerialNumber;
        scsi_read_capacity_data        rdCapacityData;
        UINT32                         devCapacity;
        UINT32                         deviceType;
        // this KB/MB/GB
        char                           devCapSuffix[3];
};

// PORT DATA BASE ENTRY
class PortDBEntry {
public:

UINT32
                loopId       : 8,
                             : 3,
                scanLuns     : 1,
                fabLoggedIn  : 1,
#define PDB_ROLE_TARGET    1
#define PDB_ROLE_INITIATOR 2
                roles        : 2,
                valid        : 1;
        UINT32  portId;        // 24 bit port address
        char    node_wwn[8];
        char    port_wwn[8];
        // link list of luns
        LunDataBaseEntry               *lunDBHead_m;
        LunDataBaseEntry               *lunDBTail_m;
        int     numberLuns;
};
```

FIG 5

SYSTEM AND METHOD FOR CONFIGURING FIBRE-CHANNEL DEVICES

FIELD

The present invention relates generally to configuring storage area networks, and more particularly to systems and methods for configuring fibre-channel devices.

RELATED FILES

This invention is related to application Ser. No. 10/128,656, filed even date herewith, entitled "SCSI-BASED STORAGE AREA NETWORK", application Ser. No. 10/131,793, filed even date herewith, entitled "VIRTUAL SCSI BUS FOR SCSI-BASED STORAGE AREA NETWORK", application Ser. No. 10/131,782, filed even date herewith, entitled "VIRTUAL MAC ADDRESS SYSTEM AND METHOD", application Ser. No. 10/131,789, filed even date herewith, entitled "METHOD AND APPARATUS FOR ASSOCIATING AN IP ADDRESS AND INTERFACE TO A SCSI ROUTING INSTANCE"; provisional application Ser. No. 60/374,921, filed even date herewith, entitled "INTERNET PROTOCOL CONNECTED STORAGE AREA NETWORK", and application Ser. No. 10/128,993, filed even date herewith, entitled "SESSION-BASED TARGET/LUN MAPPING FOR A STORAGE AREA NETWORK AND ASSOCIATED METHOD", all of the above of which are hereby incorporated by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Cisco Systems, Inc. All Rights Reserved.

BACKGROUND

The use of data storage and networks in both personal and commercial settings continues to grow at a rapid pace. In order to accommodate this growth, it is generally necessary to provide additional data storage and network devices. For example, as the number of network elements increase, it is generally necessary to add routers, switches and/or hubs to the network. Similarly, as data storage needs grow, additional storage capacity must be provided. One manner in which additional storage capacity can be added is through the use of a Storage Area Network (SAN).

In order for network devices and SANs to function as desired, they must be configured correctly. Generally this configuration must be supplied by a user or administrator. Unfortunately, the configuration parameters can be difficult to remember and susceptible to errors during the entry of the parameter. For example, in order to properly configure a SAN that uses a fibre-channel communications network, a user may need to enter a "World Wide Port Name" (WWPN). The WWPN comprises an eight-byte identifier that is commonly expressed as a sixteen digit hexadecimal number. Because it is a relatively long number, it is both difficult to remember and susceptible to error during data entry.

In view of the above, there is a need in the art for a means to simplify configuration of network and storage devices.

SUMMARY

The above-mentioned shortcomings, disadvantages and problems are addressed by the present invention, which will be understood by reading and studying the following specification.

In one embodiment of the invention, a system includes a configuration module operable to configure a routing device to communicate with one or more network devices. Each of the network devices having device identifiers and other device data. The device data can be maintained in a database. The system also includes a command interpreter for the configuration module. The command interpreter operates to display at least a subset of the device identification data in response to detecting a completion token entered by the user.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

OPERATING ENVIRONMENT

Figure 1:
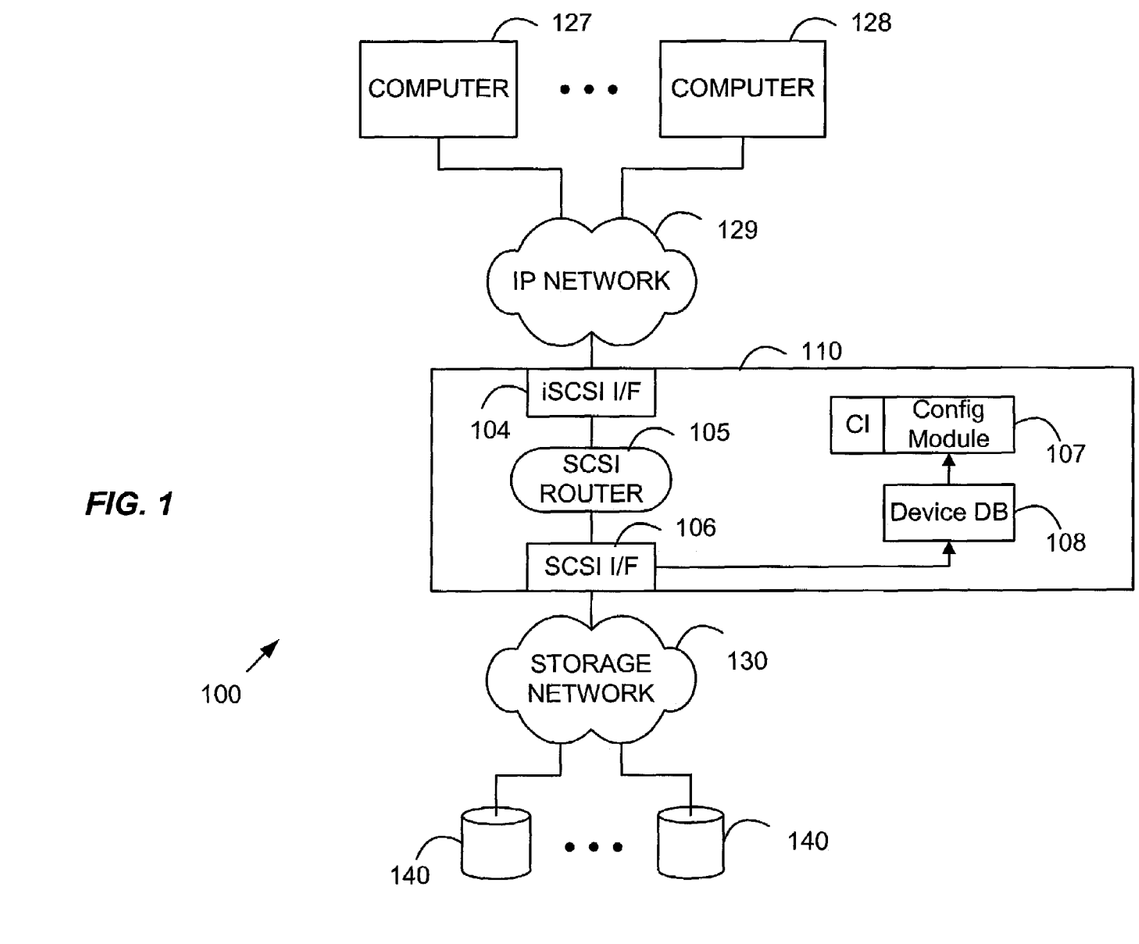
FIG. 1 is a block diagram of a storage router hardware and operating environment in which different embodiments of the invention can be practiced.

Some embodiments of the invention operate in an environment of systems and methods that provide a means for fibre-channel bases SANs to be accessed from TCP/IP network hosts. FIG. 1 is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 3, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform with its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a single Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. You can map an iSCSI target to multiple physical devices. An iSCSI target always contains at least one Logical Unit Number (LUN). Each LUN on an iSCSI target is mapped to a single LUN on a physical storage target.

Further details on the operation of the above can be found in U.S. patent application Ser. No. 10/131,793 entitled ""VIRTUAL SCSI BUS FOR SCSI-BASED STORAGE AREA NETWORK" which has been previously incorporated by reference.

Configuration module 107 operates to configure various aspects of storage router 110, including the mappings described above. In addition, configuration module 107 may be used to configure communications with storage network 130 and IP network 129.

In some embodiments, the configuration data may be supplied through a command interpreter. In one embodiment, the command interpreter is command line based. However, the invention is not limited to an particular form of command interpreter, and in alternative embodiments of the invention, the command interpreter may include a graphical user interface.

Database 108 includes information regarding devices on the storage area network 130. Database 108 may be an in-memory database comprising one or more structures containing device data. For example, database 108 may comprise a table, an array, a linked list of entries, or any combination thereof. Additionally, database 108 may comprise one or more files on a file system. Further database 108 may comprise a relational database management system. The invention is not limited to any particular database type or combination of database types. Furthermore, database 108 may exist as multiple databases or it may be a single database.

Figure 2:
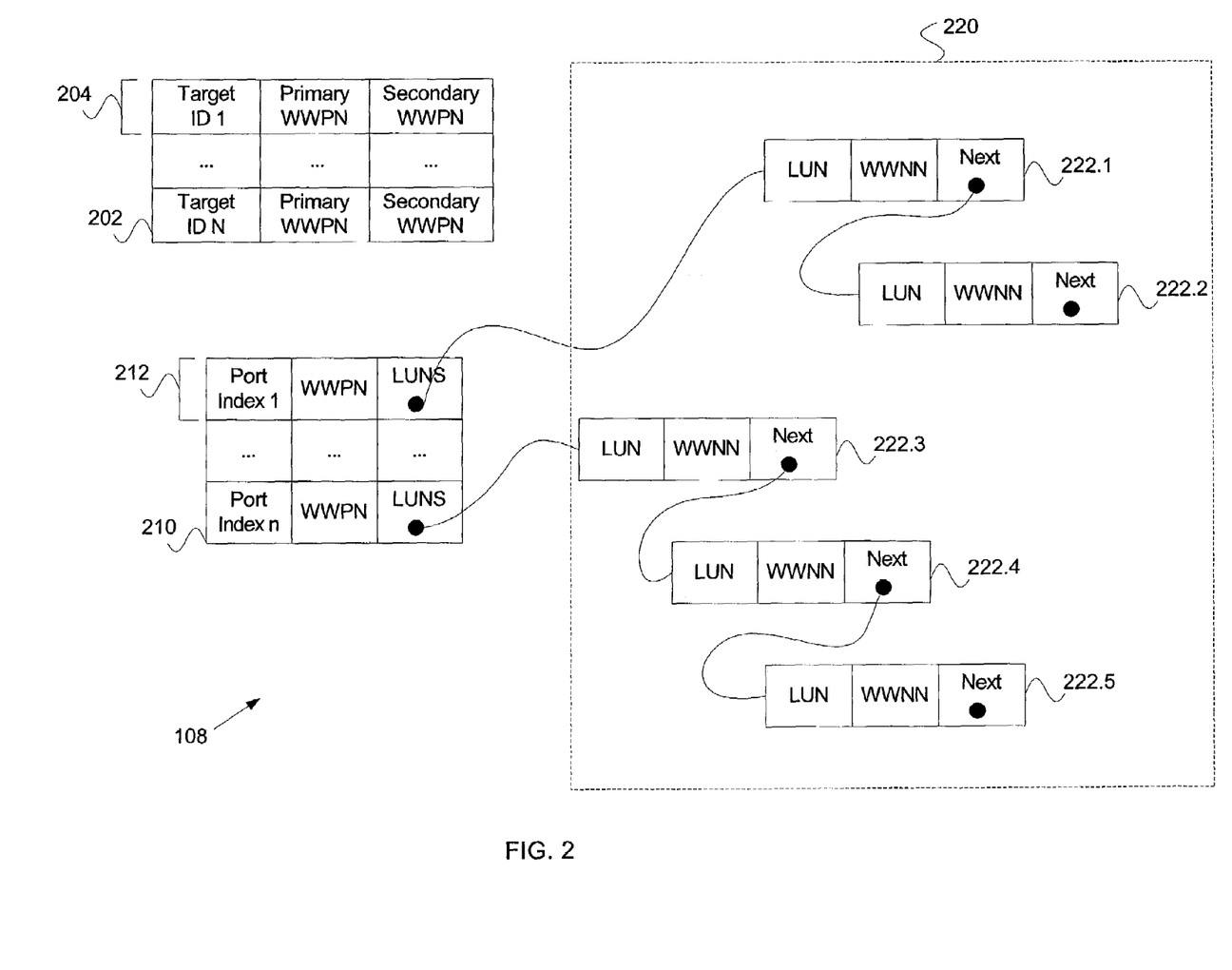
FIG. 2 is a diagram providing further details of a device database embodiment of the invention.

FIG. 2 provides further details of an exemplary device database 108 used in some embodiments of the invention. Exemplary Device database 108 includes a port database 210 and a LUN database 220. Additionally, some embodiments of the invention include an alternative path database 202.

Port database 210 comprises a set of fields providing information about ports in a network, including storage area networks. In some embodiments, port database 210 includes one or more entries 212 having a set of fields. In some embodiments, the fields in port database 210 include a port index, a port WWPN, and LUN list. The port index uniquely identifies an entry in port database 210. In some embodiments, the port index can be inferred by the position of the entry in the table, and need not be physically present. The port WWPN field contains data specifying the WWPN for the port. The LUN list field contains data that identifies the LUNs associated with the port. In some embodiments, the LUN list field is a link (i.e. a pointer) to a linked list of LUN database entries. However, the invention is not limited to any particular representation for the LUN list field, and in alternative embodiments the LUN list field may be a table or array of LUN list entries.

Lun database 220 comprises a set of fields that provide information about LUNs in a network. Typically the LUNs will be associated with a port. In some embodiments, the LUN database comprises a linked list of entries 222. In some embodiments, the fields in port database 220 include a LUN field, a WWNN field, and a next LUN link. The LUN field contains data identifying the LUN. The WWNN field contains the WWNN associated with the LUN. The next LUN field comprises data identifying the next LUN in a list of LUNs.

Figure 5:
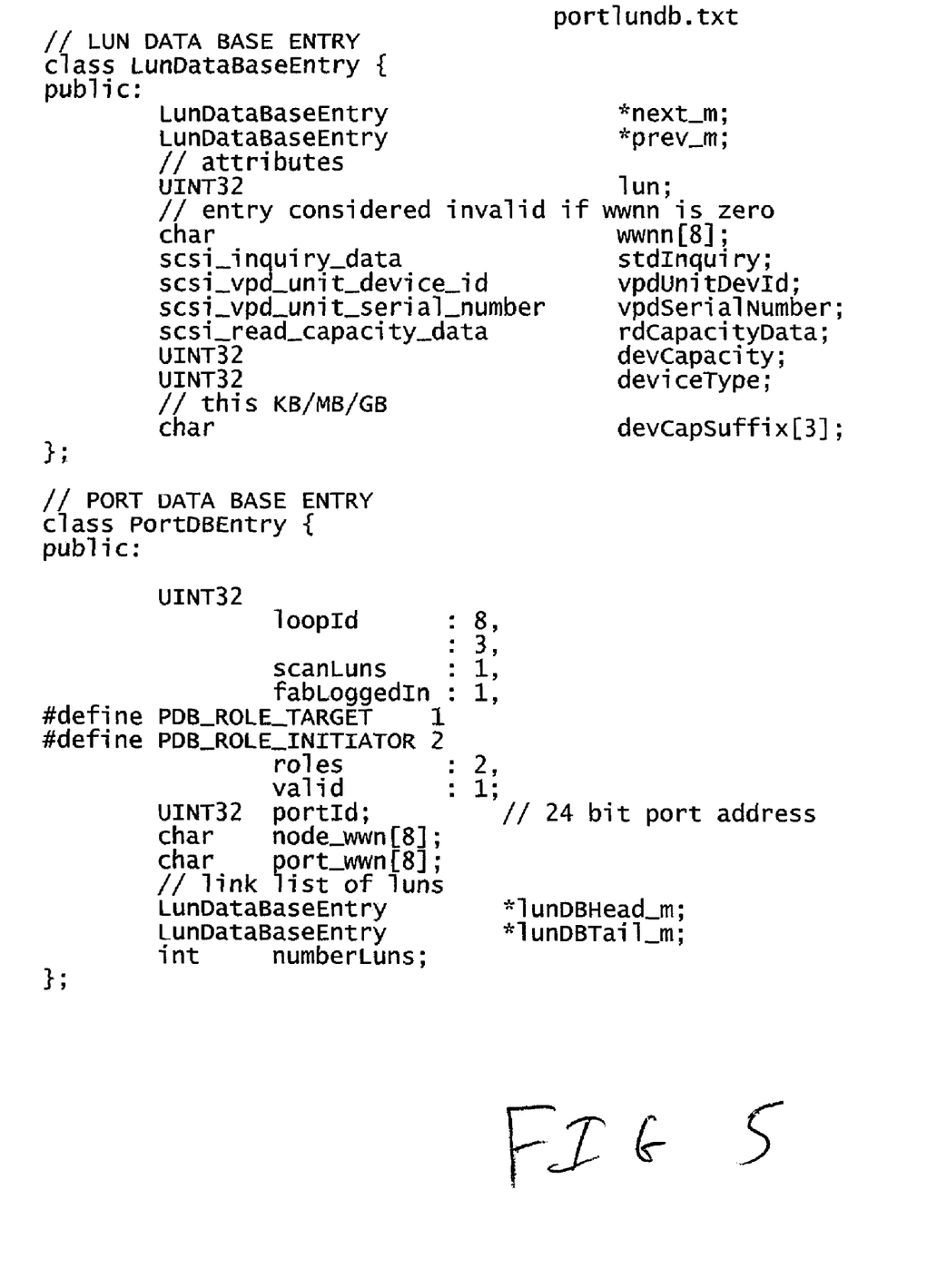
FIG. 5 provides exemplary data structures in the C/C++ language that provide definitions of a port database and a LUN database.

A C/C++ language description of a port database 210 and LUN database 220 according to an embodiment of the invention is illustrated in FIG. 5.

Some embodiments of the invention include an alternative path database 202. Alternative path database 202 comprises one or more entries 204 that define paths to targets available in a storage network. In some embodiments, the fields in an entry 204 include a target ID, a primary WWPN, and a secondary WWPN. The target ID identifies a particular target in a storage area network. The primary WWPN field contains data identifying the primary WWPN, that is, the WWPN that the system will attempt to use first when communicating with the target. The secondary WWPN contains data identifying the secondary WWPN for the target. The system will use the secondary WWPN to communicate with the target if the primary WWPN is not available.

In some embodiments, a discovery process is used to provide data for some portions of database 108. The discovery process comprises logic to determine the devices 140 that are communicably coupled to a storage network 130. Several different events may trigger the discovery process. For example, the discovery process may execute when the system is initialized, when the system is reset, when a new device is added to the storage network, or when a device on the storage network changes state. The discover logic may be executed in firmware, or it may be executed in software, for example, in a device driver. As those of skill in the art will appreciate, the discovery process will differ depending on the type of storage network 130 coupled to storage router 110.

An exemplary discovery process for a fibre-channel based storage network used in some embodiments of the invention will now be described. In some embodiments, discovery comprises two main steps, port discovery and device discovery. Port discovery determines the target and/or initiator ports on the fibre-channel, and device discovery determines the LUNs (Logical Unit Numbers) on each target port.

As is known in the art, fibre-channel networks may exist in a number of different network topologies. Examples of such network topologies include private loops, public loops, or fabrics. The port discovery process in different embodiments of the invention may vary according to the network topology.

In loop based topologies, such as private or public loops, some embodiments of the invention, the discovery process acquires a loop map. The loop map is typically created during low-level loop initialization. In some embodiments, the loop map comprises an ALPA (Arbitrated Loop Physical Address) map. For each port in the loop map, the discovery process populates various fields of the port database. In some embodiments, these fields include the world wide port name (WWPN), the ALPA/loopid, and the port role (e.g. target and/or initiator). If the loop is a private loop, the port discovery process is generally complete when each port in the loop map has been processed. If the loop is a public loop, port discovery continues with the discovery of devices connected to the fabric In fabric-based topologies, the discovery process communicates with a fabric directory server (also referred to as a name server) and obtains a list of all devices known to the fabric switch. In some embodiments, a series of "Get All Next (GA_NXT) extended link service commands are issued to the storage network to obtain the list. The directory server responds with the port identifier (portId) and WWPN for the port. This data may then be used to populate various fields of the port database 210.

In some embodiments, after port discovery as discovered ports on the storage network, device discovery identifies devices on each port. In some embodiments, for each port found during port discovery that is a target device, a "Report LUNS" SCSI command is issued to LUN 0 on the port. If the device supports the command, the device returns a list of LUNs on the port. If the device does not support the command, the discovery process of some embodiments builds a local list of LUNs comprising LUN 0 to LUN 255.

For each LUN in the list, the discovery process issues one or more SCSI inquiry commands. These commands and the returned data include the following:

| | |
|---|---|
| Standard Inquiry | returns the device type, offline/online flags, vendor data, product data, and version data for the LUN. |
| Device ID Inquiry | Returns the world wide node name (WWNN) of the LUN. |
| Serial Number Inquiry | Returns the serial number for the LUN. |

The data returned by the above-described commands is the used to populate corresponding fields in the LUN database 220.

It should be noted that while the exemplary environment has been described in terms of a storage router, the present invention may be implemented in any type of network element, including IP routers, switches, hubs and/or gateways.

Figure 3A:
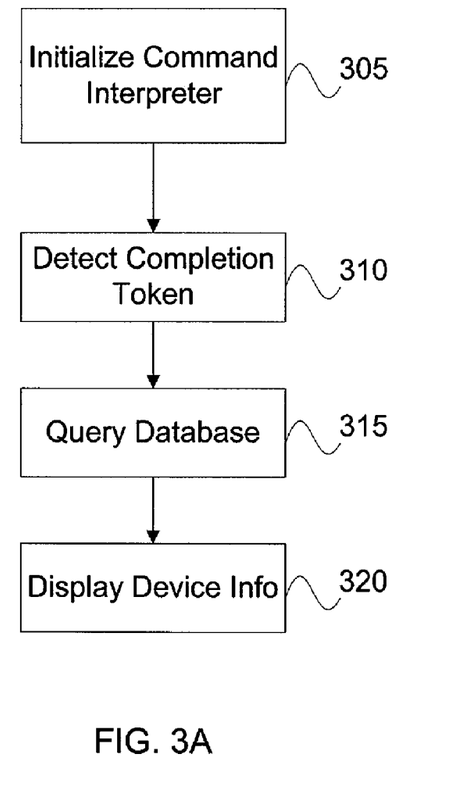
FIGS. 3A and B are flowcharts illustrating methods for configuring a network element according to an exemplary embodiment of the invention.

The operation of the above components will now be described with reference to FIGS. 3A and 3B. FIG. 3*a* illustrates a method for displaying a table of potential input data during a configuration session. A system executing the method, such as storage router 110, begins by initializing a command interpreter (block 305). The command interpreter may be initialized in response to system startup, or it may be initialized in response to a user logging on to a console port (not shown) or a management interface port (not shown). The invention is not limited to any particular command interpreter initialization event.

After the command interpreter has been initialized, it is ready to receive user input. The user input may comprise various commands used to configure and control the operation of a network element such as storage router 110. During the operation of the command interpreter, the user may input a completion token at any point in the input stream. In one embodiment of the invention, the completion token is the question mark character "?". However, the invention is not limited to any particular completion token character or string of characters. As an example, consider the following input stream:

add scsirouter zeus target chimaera_email lun 23 loopid ?

In some embodiments, this command specifies a SCSI routing service named zeus and an iSCSI target as named chimaera_email, using LUN 23. In this example, the user does not know or is not sure what value to enter for the loopid, and therefore enters a question mark as a completion token in order to prompted for an indexed list of storage addresses available.

The system detects the completion token (block 310), and in response issues a query to a database of potential input data that can be supplied to the command interpreter (block 315). In one embodiment of the invention, the potential input data comprises device data that has been previously gathered during a device discovery process as described above.

Figure 4:
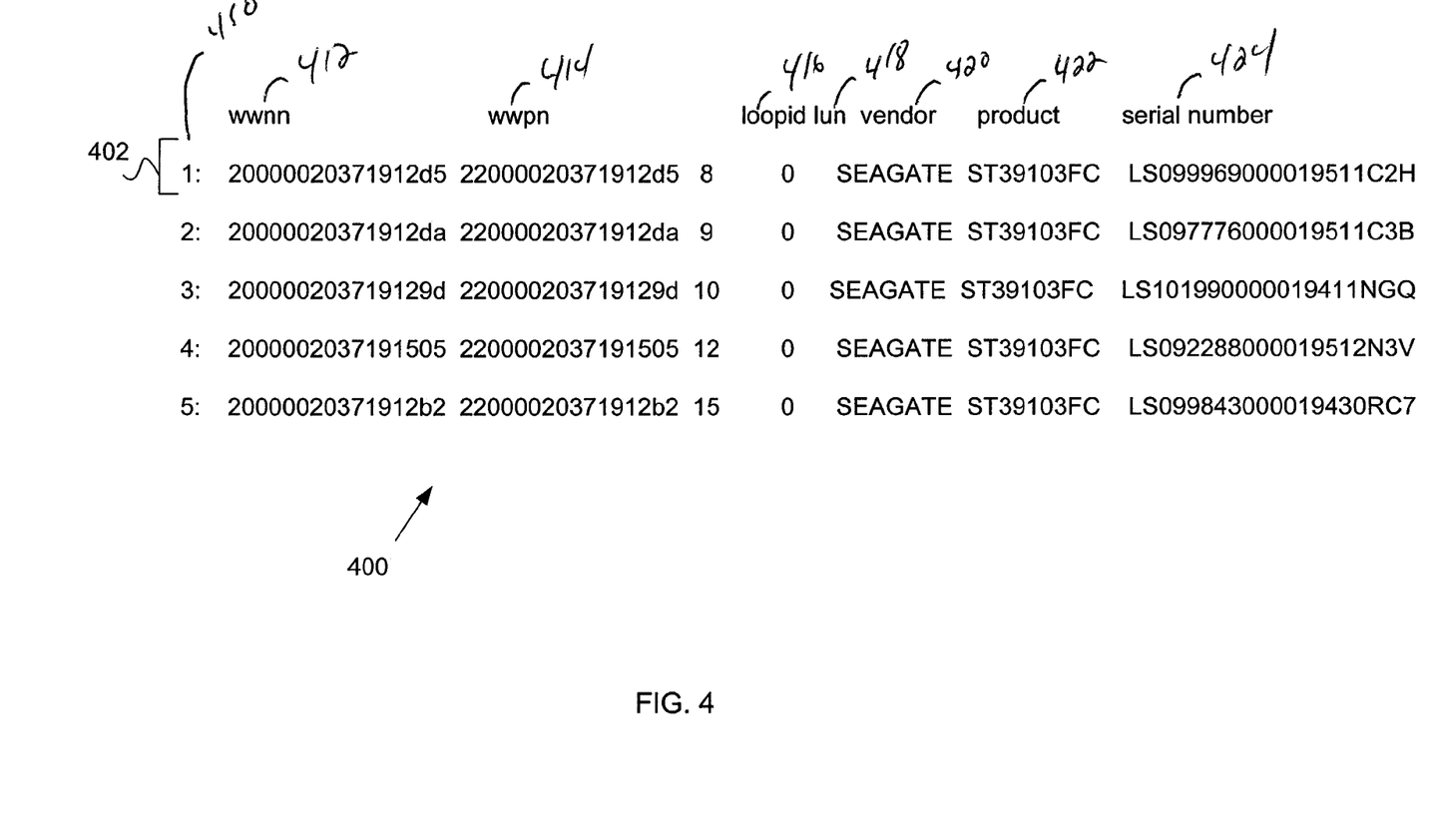
FIG. 4 is an illustration of an exemplary table displayed to a user in an exemplary embodiment of the invention.

The system executing the method then displays a table of potential input data. An example table 400 is shown in FIG. 4. In some embodiments, table 400 includes columns that can provide input data for configuring fibre-channel devices. However, the invention is not limited to fibre-channel configuration and those of skill in the art will recognize, using the teaching of the specification, how to adapt the present invention to various environments.

In some embodiments, each entry 402 in table 400 represent data for a different device on storage network 140. In some embodiments, fields in table 400 include index 410, wwnn field 412, wwpn field 414, loopid field 416, LUN field 418, vendor field 420, product field 422 and serial number field 424. Index 410 identifies an entry in the table. Index 410 may not be physically present in the database, but rather it may be inferred from the ordering of table and generated for display purposes. Wwnn field 412 contains the world wide node name for the device. Wwpn field 414 contains the world wide port name for the device. Loopid 416 contains the loop identifier for the device. Lun 418 contains the logical unit number (LUN) for the device. Vendor 420 contains the name of the vendor or manufacturer of the device. Product 422 contains a product identifier for the device. Finally, serial number 424 contains a unique serial number for the device. Those of skill in the art will appreciate that alternative devices may require alternative fields, and that such alternative fields are within the scope of the invention.

Figure 3B:
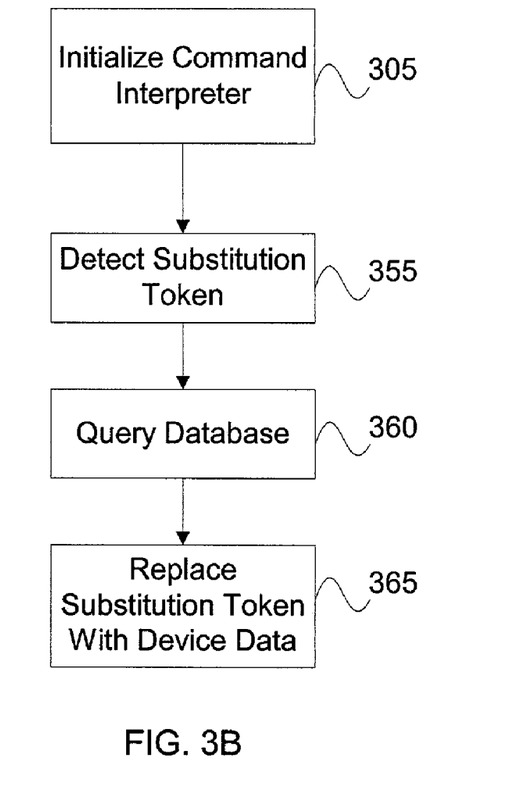

A method of automatically supplying input data from a table such as table 400 is illustrated in FIG. 3B. A system executing the method begins by initializing a command interpreter (block 305). After the command interpreter has been initialized, it is ready to receive user input. Again, the user input may comprise various commands used to configure and control the operation of a network element such as storage router 110. During the operation of the command interpreter, the user may input a substitution token at any point in the input stream. In one embodiment of the invention, the completion token is the pound (also referred to as a hash) character "#". However, the invention is not limited to any particular character or string of characters for the substitution token. To continue with the example above, assume that the user has issued the completion token causing the display of table 400. Further assume that the user has then provided the following input stream:

add scsirouter zeus target chimaera_email lun 23 loopid #5

In some embodiments, this command causes the system to choose a physical address designated by index number 5 in table 400, as specified by the substitution token and index number combination "#5" to map iSCSI target and LUN combination, chimaera_email, LUN 23 to physical address LoopID 15, LUN 0.

The system detects the substitution token "#" and the following parameter "5", and uses this data to query the database to find the appropriate entry (block 360). The index specifies the entry (i.e. row) in table 400. In some embodiments, the name of the column in table 400 that matches the parameter name preceding the substitution token is used to specify the column that will supply the substitution data. In the example above, the string "loopid" is supplied as a parameter name preceding the substitution token. Therefore, the system queries the database for the loopid field 416 of entry 5.

Finally, the system uses this data to substitute for the substitution token and parameter in order to complete the command (block 365). It should be noted that the replacement need not be physically shown on the command line. Rather, the replacement data may be supplied to the command interpreter as if it had been supplied on the command line.

Various software components in a system that perform configuration of network elements such as storage routers As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

CONCLUSION

Systems and methods for configuring network elements are disclosed. In one embodiment, the system includes a configuration module operable to configure a network element to communicate with a plurality of network devices. The configuration module includes a command interpreter that can query device data associated with the devices, and display the data to a user. In addition, the command interpreter can substitute data in the database for parameters on the command line.

The embodiments of the invention provide advantages over previous systems. The user does not have to remember or manually look up large quantities of device configuration information. Furthermore, the risk of entering erroneous data is lessened through the operation of a substitution token that can be used to specify data in the database that is to be supplied to the command line.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A system comprising:
a configuration module operable to configure a network element to communicate with a plurality of network devices, each of said network devices having fibre-channel device identifiers;
a database operable to store fibre-channel device identification data representing the fibre-channel device identifiers;
a command interpreter for the configuration module operable to display at least a subset of the fibre-channel device identification data in response to detecting a completion token in a command line input stream, wherein the fibre-channel device identification data is displayed prior to the completion of the command line input stream.

2. The system of claim 1, wherein the plurality of network devices comprise fibre-channel devices.

3. The system of claim 1, wherein the fibre-channel device identification data comprises data selected from the group consisting of: world wide port name, world wide node name, loopid, and serial number.

4. The system of claim 1, wherein the completion token comprises a "?"character.

5. The system of claim 1, wherein the subset of fibre-channel device identification data is displayed in a table format.

6. The system of claim 1, wherein the subset of fibre-channel device identification data is displayed in a list format.

7. The system of claim 1, wherein the database comprises a port database and a LUN database.

8. The system of claim 1, wherein the command interpreter is further operable to:
   detect a substitution token in the command line input stream; and
   replace a command line parameter with data from the database identified by the substitution token prior to the completion of the command line input stream.

9. A method for configuring a network device, the method comprising:
   providing a command interpreter operable to interpret a command line input stream;
   detecting a completion token in the command line input stream;
   querying a database containing fibre-channel device information upon detecting the completion token;
   displaying the fibre-channel device information; and
   receiving further input based on the fibre-channel device information prior to completion of the command line input stream.

10. The method of claim 9, wherein the completion token is a "?" character.

11. The method of claim 9, wherein displaying the fibre-channel device information displays a table of device information.

12. The method of claim 9, where the command interpreter is a command line interface.

13. The method of claim 9, wherein the database is an in-memory database.

14. A method for configuring a network device, the method comprising:
   providing a command interpreter operable to interpret a command line in put stream;
   detecting a substitution token and substitution index in the command line input stream;
   querying a database containing device information upon detecting the substitution token using the substitution index to specify fibre-channel device data; and
   replacing the substitution token and index with the device data in the command line input stream prior to completion of the command line input stream.

15. The method of claim 14, wherein the substitution token is the "#" character.

16. A system for configuring a network device, the system comprising:
   means for interpreting a command line input stream;
   means for detecting a completion token in the command line input stream;
   means for querying a database containing fibre-channel device information upon detecting the completion token; and
   means for displaying the fibre-channel device information;
   wherein the means for interpreting the command line input stream receives further input based on the fibre-channel device information prior to completion of the command line input stream.

17. The system of claim 16, wherein the completion token is a "?" character.

18. The system of claim 16, wherein the means for displaying the fibre-channel device information displays a table of fibre-channel device information.

* * * * *

UNITED STATES PATENT AND TRADEMARK OFFICE
CERTIFICATE OF CORRECTION

PATENT NO. : 7,200,610 B1
APPLICATION NO. : 10/128655
DATED : April 3, 2007
INVENTOR(S) : Prawdiuk et al.

Page 1 of 1

It is certified that error appears in the above-identified patent and that said Letters Patent is hereby corrected as shown below:

On the title page; item [56]:

On page 2, under "Other Publications", in column 2, line 17, delete "obrtained" and insert -- obtained --, therefor.

In column 4, line 7, before "VIRTUAL" delete """" and insert -- " --, therefor.

In column 4, line 58, delete "Lun" and insert -- LUN --, therefor.

In column 5, line 58, after "fabric" insert -- . --.

In column 7, line 20, delete "Lun" and insert -- LUN --, therefor.

Signed and Sealed this

Eighth Day of July, 2008

JON W. DUDAS
*Director of the United States Patent and Trademark Office*